(12) United States Patent
Grattan

(10) Patent No.: US 8,662,571 B2
(45) Date of Patent: Mar. 4, 2014

(54) VEHICLE HOOD ENERGY ABSORBING ASSEMBLY

(75) Inventor: Patrick Grattan, Novi, MI (US)

(73) Assignee: Nissan North America, Inc., Franklin, TN (US)

( * ) Notice: Subject to any disclaimer, the term of this patent is extended or adjusted under 35 U.S.C. 154(b) by 0 days.

(21) Appl. No.: 13/351,696

(22) Filed: Jan. 17, 2012

(65) Prior Publication Data

US 2013/0181484 A1     Jul. 18, 2013

(51) Int. Cl.
   *B62D 25/10*     (2006.01)
(52) U.S. Cl.
   USPC ............... 296/193.11; 296/187.04; 180/69.2
(58) Field of Classification Search
   USPC ............ 296/193.11, 193.09, 203.02, 187.04; 180/69.2, 69.21
   See application file for complete search history.

(56) References Cited

U.S. PATENT DOCUMENTS

| | | | |
|---|---|---|---|
| 5,988,305 A | 11/1999 | Sakai et al. | |
| 6,817,435 B2 | 11/2004 | Takeuchi | |
| 7,413,239 B2 | 8/2008 | Mitsuyama | |
| 7,578,548 B2 | 8/2009 | Behr et al. | |
| 7,631,928 B2 | 12/2009 | Ackland et al. | |
| 7,828,374 B2 | 11/2010 | Rinderlin et al. | |
| 7,988,222 B2 | 8/2011 | Fujimoto | |
| 8,167,071 B2 * | 5/2012 | Thomas et al. | 180/69.2 |
| 2009/0195031 A1 * | 8/2009 | Ishitobi | 296/193.11 |
| 2011/0169303 A1 | 7/2011 | Ikeda et al. | |
| 2011/0214932 A1 | 9/2011 | Ralston et al. | |

FOREIGN PATENT DOCUMENTS

| | | |
|---|---|---|
| EP | 1022199 B1 | 7/2000 |
| EP | 1992525 A1 | 11/2008 |
| JP | 05-139338 A | 6/1993 |
| JP | 2000-006845 A | 1/2000 |
| JP | 2003-054449 A | 2/2003 |
| JP | 2007-030693 A | 2/2007 |
| JP | 2007-326454 A | 12/2007 |
| JP | 2008-068729 A | 3/2008 |

* cited by examiner

*Primary Examiner* — Glenn Dayoan
*Assistant Examiner* — Melissa A Black
(74) *Attorney, Agent, or Firm* — Global IP Counselors

(57) ABSTRACT

A vehicle hood energy absorbing assembly includes outer and inner hood members and a support member. The outer hood member includes outer and inner surfaces facing an exterior and interior, respectively, of a vehicle. The support member is disposed within a space defined between the outer and inner hood members and includes an elongated base member and respective pluralities of front and rear leg members. The elongated base member is disposed adjacent the inner surface and extends laterally along a majority of the outer and inner hood members. The front and rear leg members extend from forward and rear portions, respectively, of the elongated base member to respective free ends that are coupled to the inner hood member. At least one leg member includes a deformation structure at which the leg member at least partially collapses upon application of a prescribed amount of force to the outer surface.

20 Claims, 12 Drawing Sheets

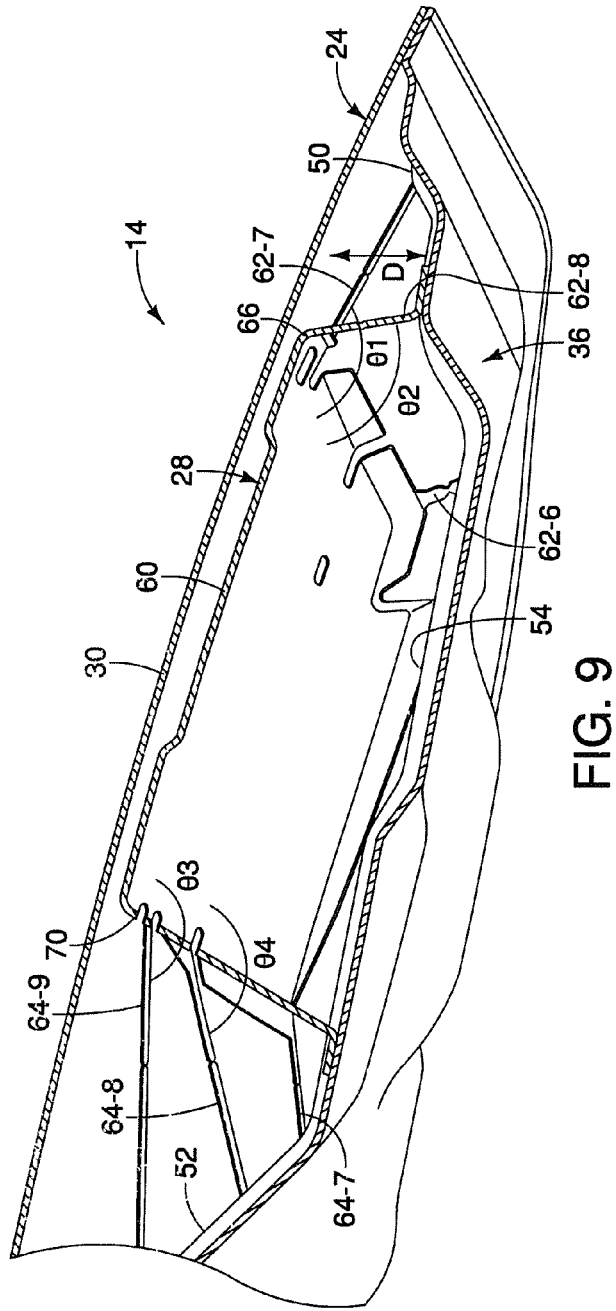
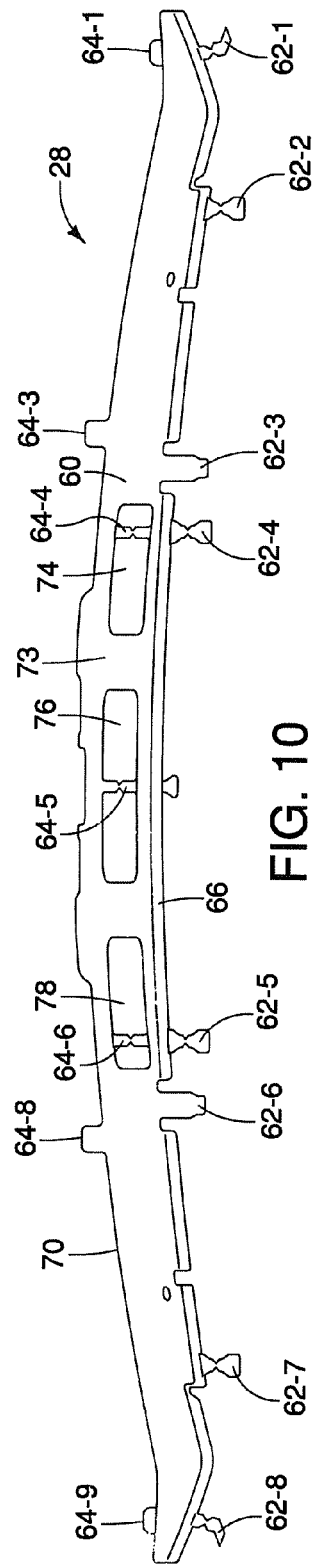
FIG. 9
FIG. 10

VEHICLE HOOD ENERGY ABSORBING ASSEMBLY

BACKGROUND OF THE INVENTION

1. Field of the Invention

The present invention relates to a vehicle hood energy absorbing assembly. More specifically, the present invention relates to a vehicle hood energy absorbing assembly that improves the ability of a vehicle hood to absorb a force applied to the exterior surface of the vehicle hood.

2. Background Information

In the automotive industry, efforts are continuously being made to improve vehicle fuel economy. One strategy for improving fuel economy includes reducing vehicle weight. As opposed to simply reducing the overall number of vehicle parts, lighter components having different material properties are also considered. For example, some vehicles are now being manufactured with lighter aluminum hoods instead of steel hoods. However, the energy absorbing characteristics of an aluminum hood are typically less desirable than those of a steel hood having a comparable construction. In one approach, one or more reinforcement brackets are included between the outer and inner panels of an aluminum hood to improve the energy absorbing characteristics of the hood.

SUMMARY

It has been discovered that conventional reinforcement brackets may not provide the desired energy absorbing characteristics in all situations, especially when a hood having an aluminum construction is utilized. Accordingly, in view of the state of the known technology, one aspect of the present invention is directed to a vehicle hood energy absorbing assembly comprising an outer hood member, an inner hood member and a support member. The outer hood member includes an outer surface facing an exterior of a vehicle and an inner surface facing an interior of the vehicle. The inner hood member is coupled to the inner surface of the outer hood member to define a space between the outer and inner hood members. The support member is disposed within the space and includes an elongated base member, a plurality of front leg members and a plurality of rear leg members. The elongated base member is disposed adjacent the inner surface of the outer hood member and extends in a lateral direction of the vehicle along a majority of the outer and inner hood members. Each of the plurality of front leg members extends from a forward portion of the elongated base member to a free end that is coupled to the inner hood member. Each of the plurality of rear leg members extends from a rearward portion of the elongated base member to a free end that is coupled to the inner hood member. At least one leg member among the plurality of front leg members and the plurality of rear leg members includes a deformation structure at which the at least one leg member at least partially collapses upon application of a prescribed amount of force to the outer surface of the outer hood member.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure:

FIG. 9 is a side cross-sectional view of a front portion of the vehicle hood in an uncompressed state;

FIG. 10 is a front elevational view of the support member shown removed from the vehicle hood energy absorbing assembly;

DETAILED DESCRIPTION OF EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
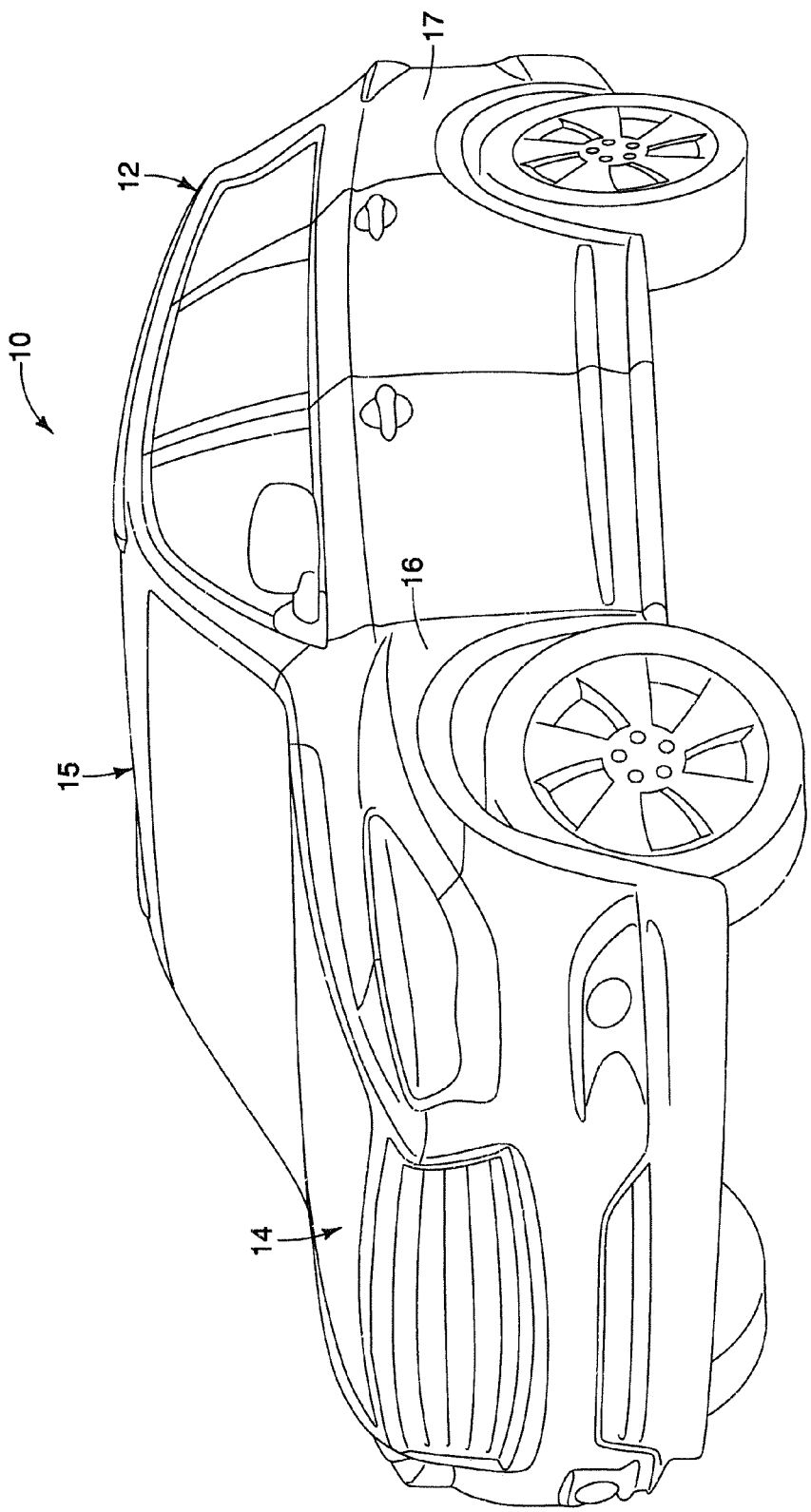
FIG. 1 is a perspective view of a vehicle including a vehicle hood energy absorbing assembly according to a disclosed embodiment.
Figure 2:
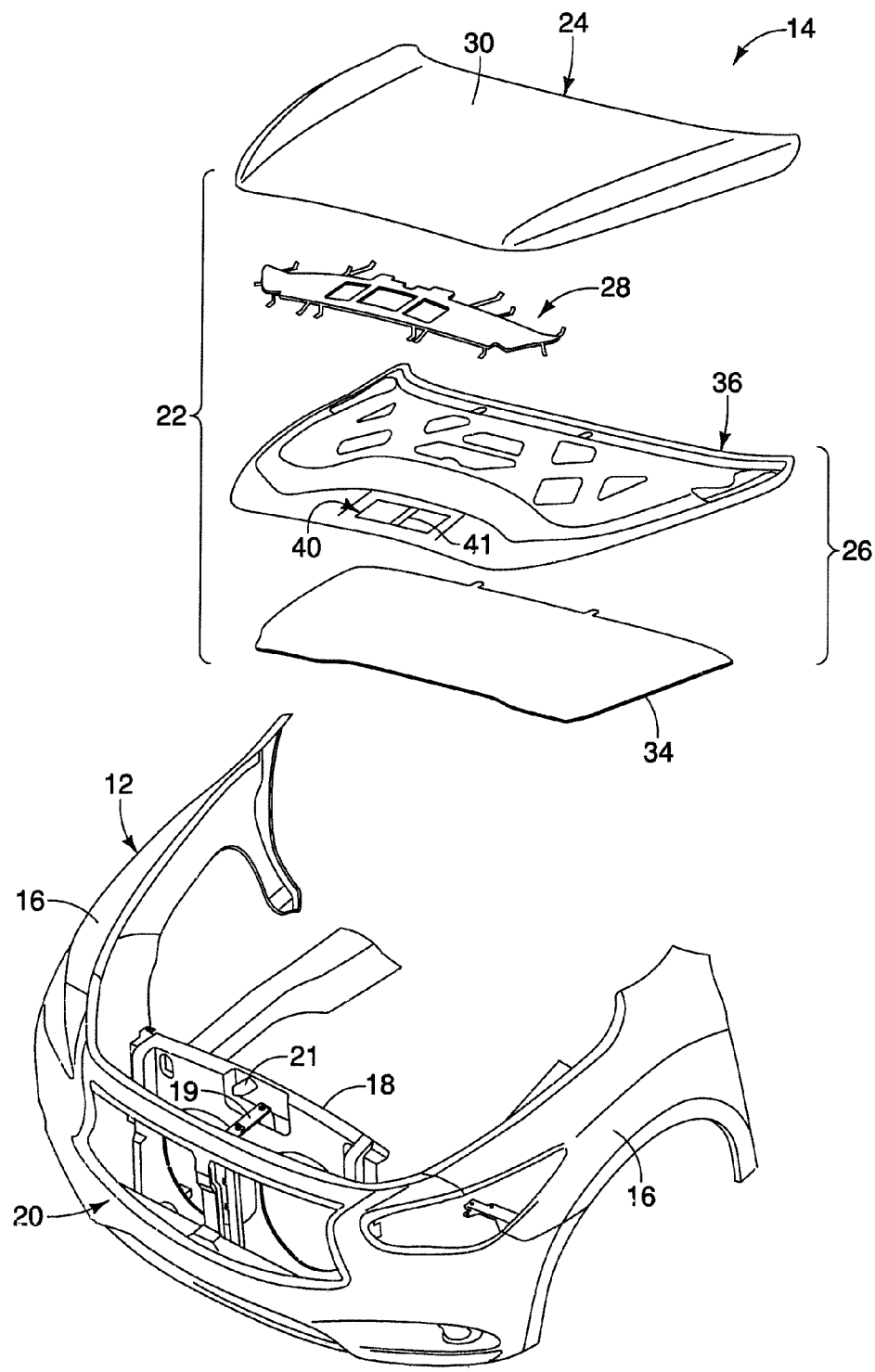
FIG. 2 is an exploded perspective view of the front end of the vehicle shown in FIG. 1 illustrating components of the vehicle hood energy absorbing assembly.

Referring initially to FIGS. 1 and 2 a vehicle 10 includes a vehicle body 12 and a vehicle hood 14. The vehicle body 12 is typically formed of a plurality of sheet metal components, such as a roof 15, front and rear fenders 16 and 17 and so on, that are secured together in any known manner. The vehicle 10 further includes a radiator core support 18 that is mounted at the front end of the vehicle body 12 in any conventional manner. As understood in the art, the radiator core 18 is a rigid structure that is made of plastic or any other suitable material and is disposed below the vehicle hood 14. Typically, a minimum clearance distance exists between the vehicle hood 14 and the top of the radiator core 18. That is, the distance between the vehicle hood 14 and the radiator core 18 is typically less than the distances between the vehicle hood 14 and any of the other components that are disposed below and inward from outer edges of the vehicle hood 14.

As further shown, a bumper fascia retainer 19 can be secured to the radiator core 18 in any conventional manner. The bumper fascia retainer 19 is typically made of metal or any other suitable material. The bumper fascia retainer 20 is configured to assist in retaining a front bumper fascia 20 to the vehicle body 12 in any conventional manner. Typically, the front bumper fascia 20 is made of plastic or any other suitable material as understood in the art, and can be mounted to the front end of the vehicle body 12 in any suitable conventional manner. In addition, a lock mechanism 21 can be mounted to the radiator core 18 to interface with a corresponding mechanism on the vehicle hood 14 to lock the vehicle hood 14 in a closed position as discussed below.

Figure 3:
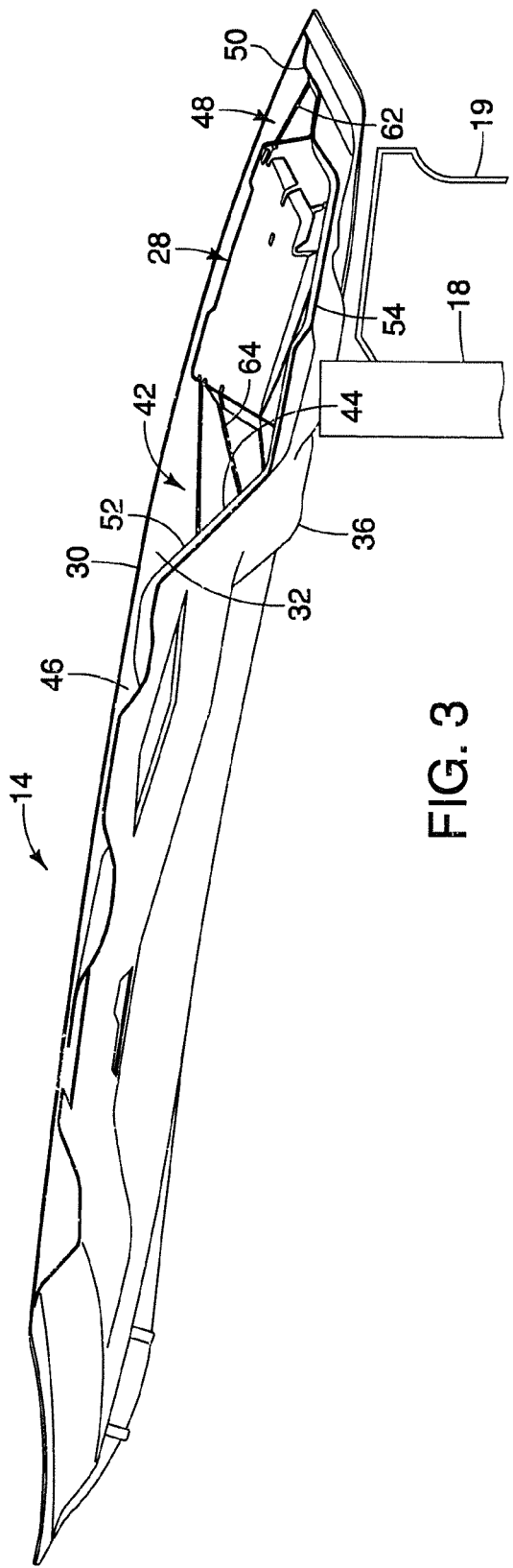
FIG. 3 is a right side cutaway view of a vehicle hood as shown in FIGS. 1 and 2.
Figure 4:
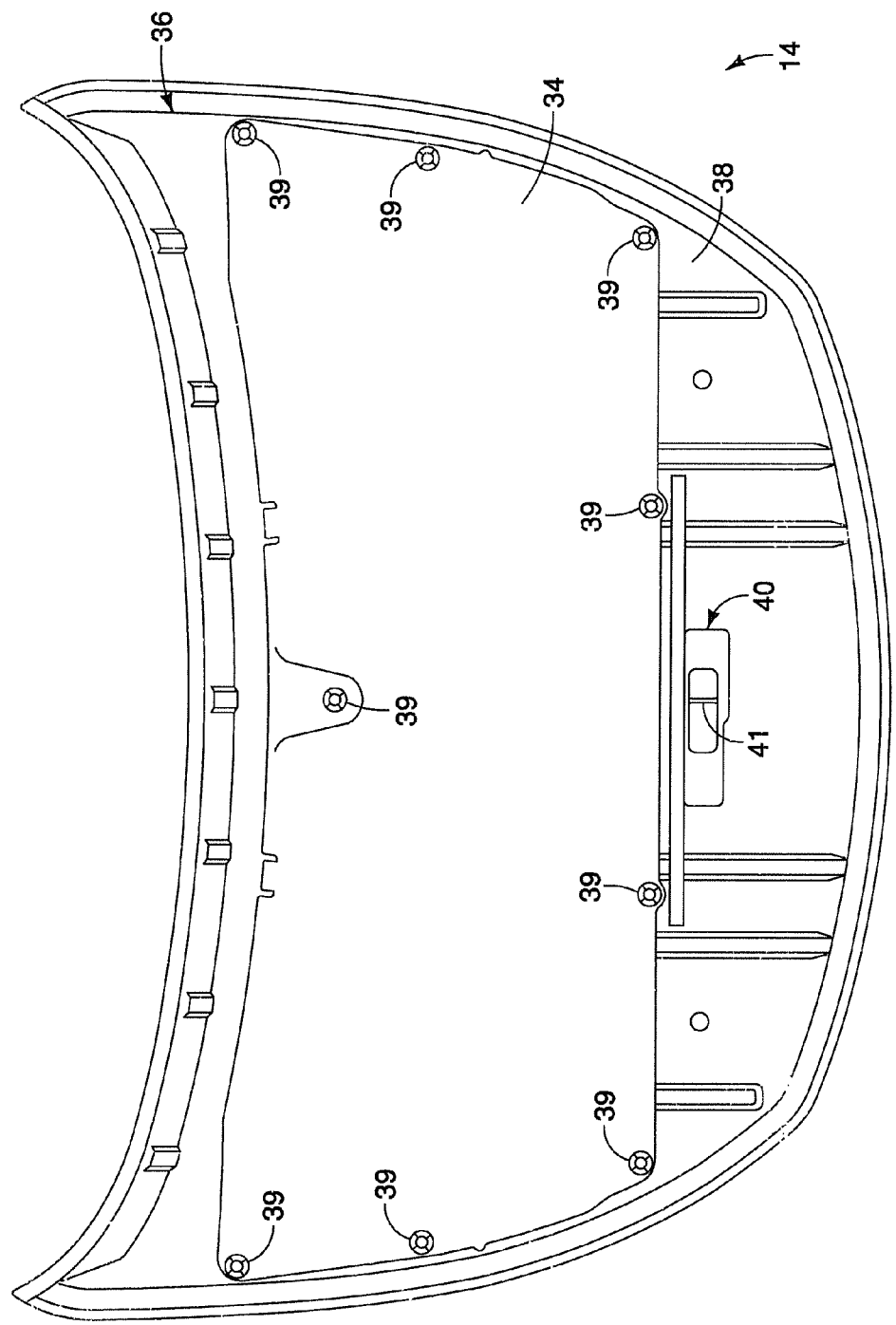
FIG. 4 is a bottom view of the vehicle hood.

The vehicle hood 14 includes components, such as hinges (not shown) that secure the vehicle hood 14 to the vehicle body 12 so that the vehicle hood 14 can moved between closed and open positions. The vehicle hood 14 further includes a vehicle hood energy absorbing assembly 22. As shown, for example, in FIGS. 2 through 4, the vehicle hood energy absorbing assembly 22 includes an outer hood member 24, an inner hood member 26 and a support member 28. The outer hood member 24 is typically made of sheet metal or any other suitable material similar to the material in which the vehicle body 12 is made. Alternatively, either or both of the inner and outer hood members 26 and 24 can have different material properties (e.g., an aluminum construction) than the rest of the vehicle body 12 as needed or desired. The outer hood member 24 includes an outer surface 30 facing an exterior of the vehicle 10, and an inner surface 32 facing an interior of the vehicle 10.

Figure 5:
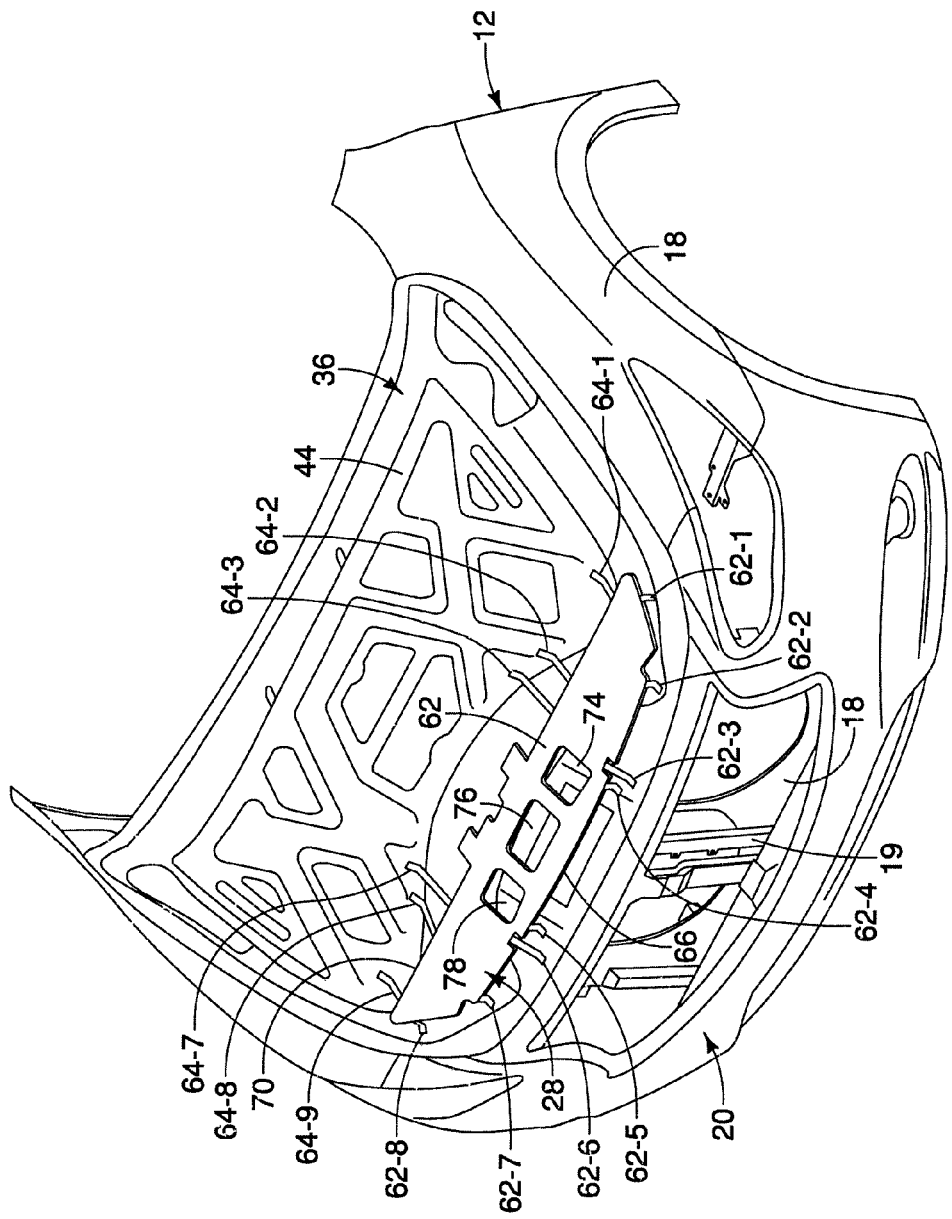
FIG. 5 is a perspective view of the front end of the vehicle with an outer hood member removed to expose an inner hood member and a support member.
Figure 6:
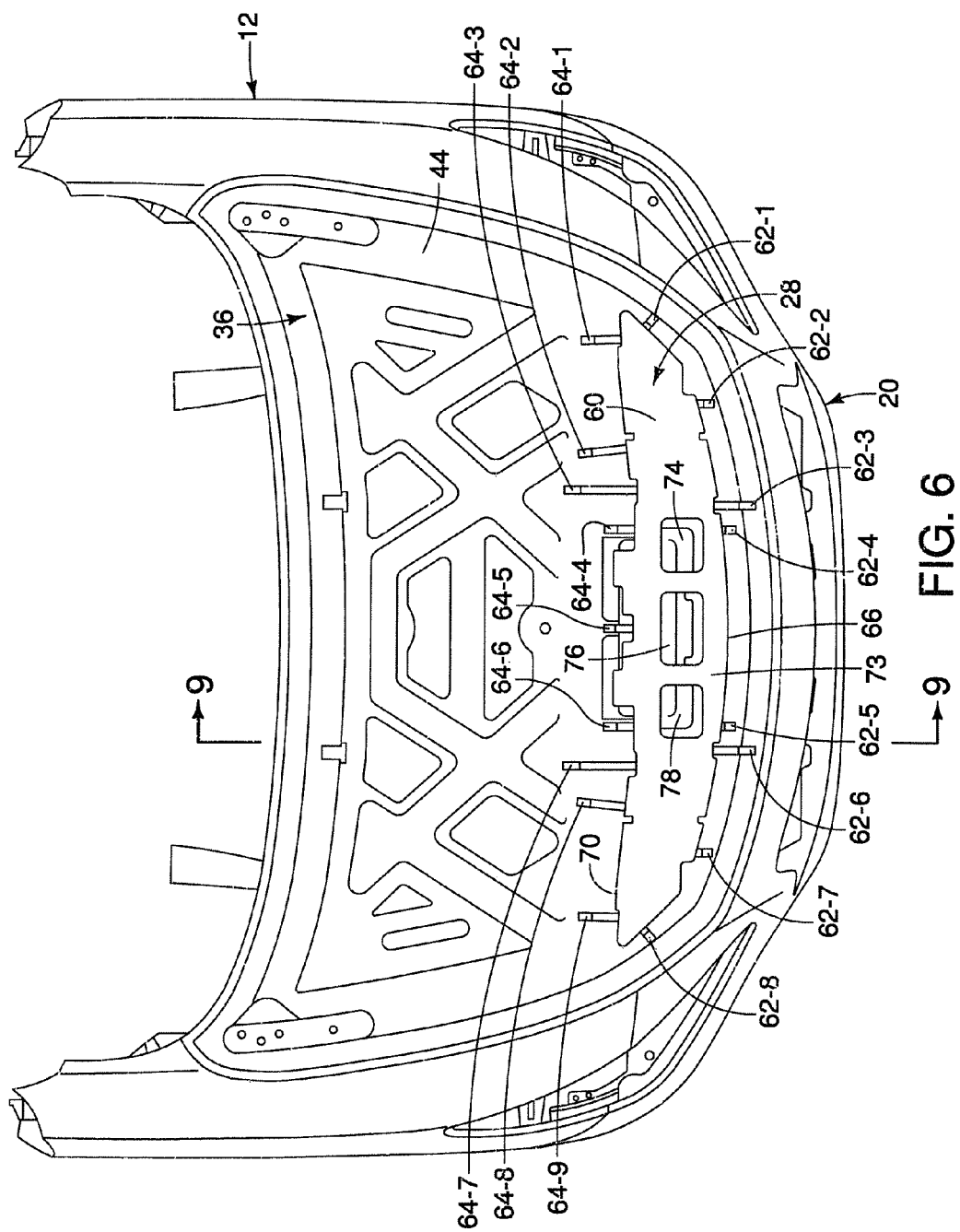
FIG. 6 is a plan view of the front end of the vehicle with the outer hood member removed.
Figure 7:
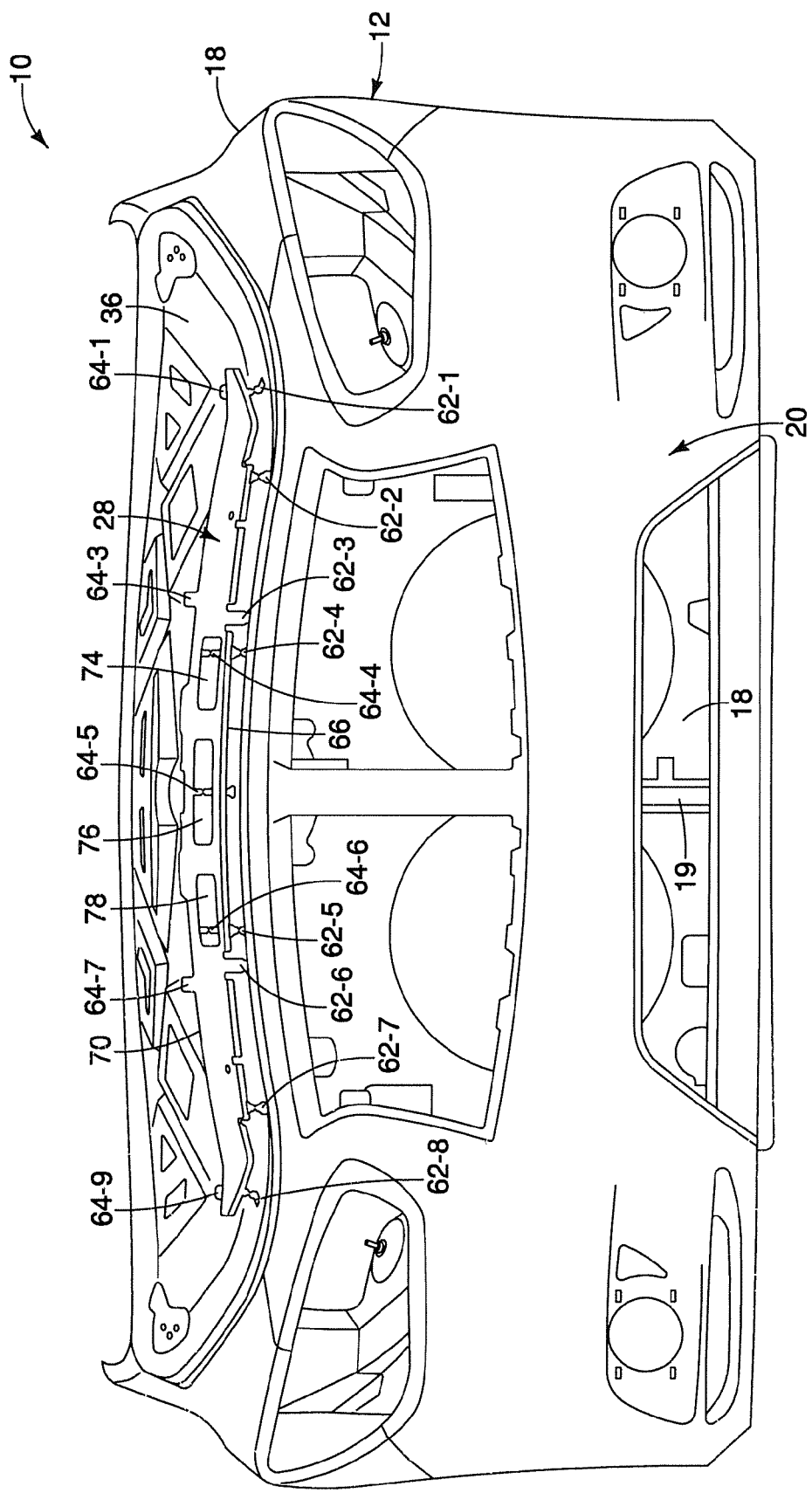
FIG. 7 is a front elevational view of the front end of the vehicle with the outer hood member removed.
Figure 8:
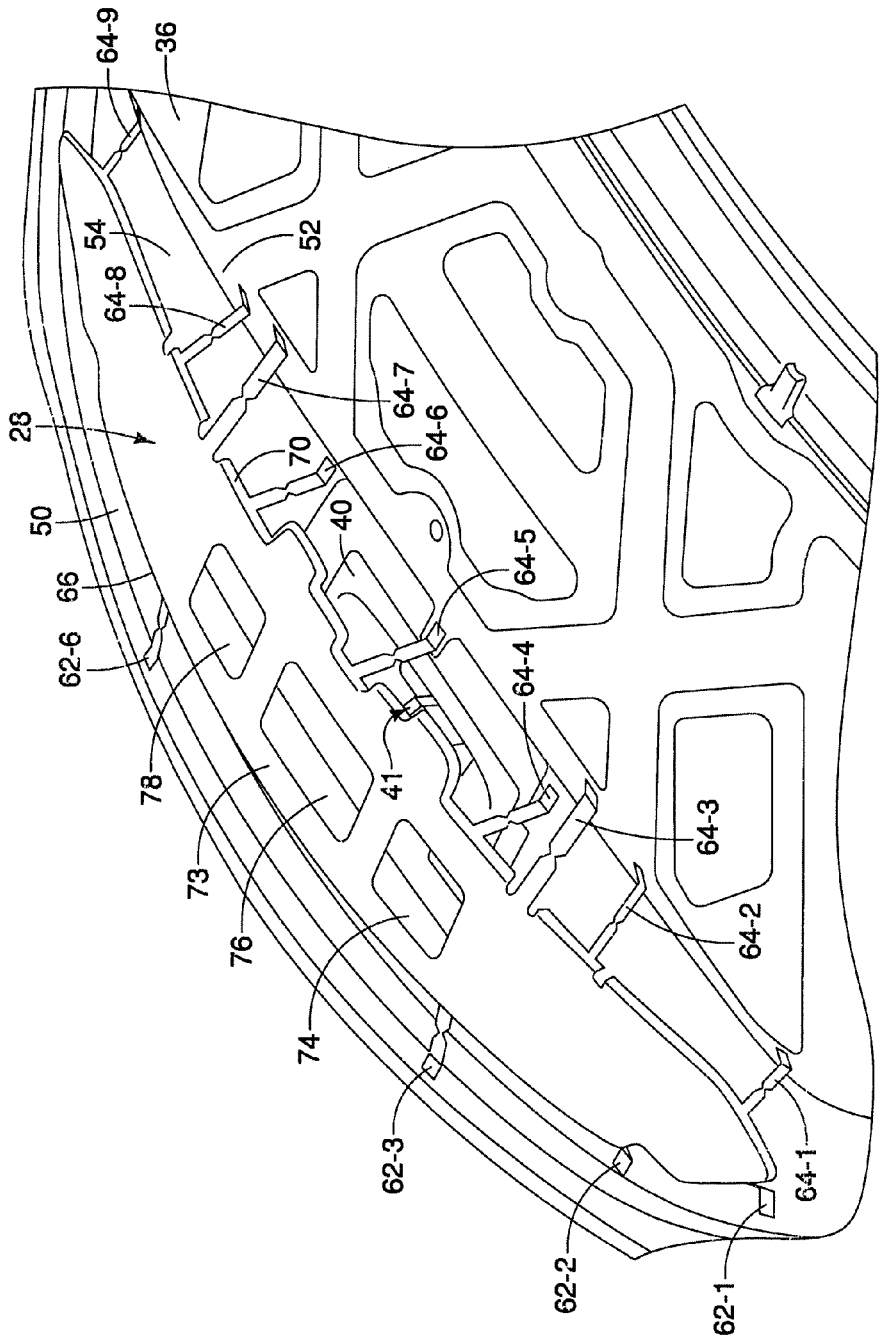
FIG. 8 is a detailed rear perspective view of the support member shown mounted to the inner hood member.

The inner hood member 26 in this example includes a lower hood layer 34 and an upper hood layer 36 that are coupled together. Further details of the inner hood member 26 are shown in FIGS. 5 though 9. The lower hood layer 34 can be, for example, a hood insulation member or another trim member that is attached to a bottom surface 38 of the upper hood layer 36 by fasteners 39 such as screws, bolts, rivets, clips or any other suitable type of fastener as understood in the art. The upper hood layer 36 is typically made of sheet metal or any other suitable material and similar in construction to the outer hood member 24.

The upper hood layer 36 of the inner hood member 26 further includes a lock structure 40. The lock structure 40 in this example is located toward the front end of the outboard hood component 34 and centrally in a lateral direction of the vehicle 10. The lock structure 40 includes a striker 41 that is configured to interface with and selectively remain retained by the lock mechanism 21 to maintain the vehicle hood 14 in a closed position as understood in the art. Accordingly, the lock structure 40 of the outboard hood component 34 is reinforced by, for example, additional metal thickness to provide additional strength for retaining the vehicle hood 14 in the closed and locked position.

The inner hood member 26 is coupled to the inner surface 32 of the outer hood member 24 to define a space 42 between the outer and inner hood members 24 and 26. In particular, the upper hood layer 36 of the inner hood member 26 is coupled to the inner surface 32 of the outer hood member 24 in any suitable manner, such as by welds, screws, bolts, rivets and so on, as understood in the art. Thus, the space 42 is defined between the inner surface 32 of the outer hood member 24 and a top surface 44 of the upper hood layer 36.

The space 42 includes a rear space portion 46 and a front space portion 48 that is situated closer to a forward edge of the vehicle hood 14 than the rear space portion 46. The inner surface 32 of the outer hood member 24 and the top surface 44 of the upper hood layer 36 are spaced further from each other in the front space portion 48 than in the rear space portion 46. Furthermore, the upper hood layer 36 of the inner hood member 26 includes a forward slanted portion 50, a rearward slanted portion 52, with a planar portion 54 situated therebetween. The forward slanted portion 50 extends from a front edge of the planar portion 54 toward the inner surface 32 of the outer hood member 24, and the rearward slanted portion 52 extends from a rear edge of the planar portion 54 toward the inner surface 32 of the outer hood member 24. Thus, the forward and rearward slanted portions 50 and 52 cooperate with the planar portion 54 to at least partially define the front space portion 48. Naturally, the forward and rearward slanted portions 50 and 52 can extend at any suitable angles relative to the planar portion 54. The angles can be equal or different, in which case the angle at which the forward slanted portion 50 extends relative to the planar portion 54 can be larger than the angle at which the rearward slanted portion 52 extends relative to the planar portion 54 or vice-versa. Also, the forward and rearward slanted portions 50 and 52 can each be planar, or either or both of the forward and rearward slanted portions 50 and 52 can include one or more steps or various other contours.

As further shown, the support member 28 of the vehicle hood energy absorbing assembly 22 is disposed within the space 42 between the outer and inner hood members 24 and 26. In particular, the support member 28 is disposed in the front space portion 48. The support member 28 can be made of sheet metal or any other suitable material similar to the material from which the vehicle body 12, the outer hood member 24 and/or the upper hood layer 36 are made. The support member 28 includes an elongated base member 60, a plurality of front leg members 62-1 through 62-8 and a plurality of rear leg members 64-1 through 64-9, as shown in FIGS. 5 through 11. The front leg members 62-1 through 62-8 can be referred to collectively as front leg members 62, and the rear leg members 64-1 through 64-9 can be referred to collectively as rear leg members 64. The elongated base member 60 is disposed adjacent the inner surface 32 of the outer hood member 24 and can be spaced from the inner surface 32 or in contact with the inner surface 32. Thus, the elongated base member 60 extends in a lateral direction of the vehicle 10 along a majority of the outer and inner hood members 24 and 26. Also, as shown in FIG. 2, the lock structure 40 and striker are mounted to the planar portion 54 of the upper hood layer 36 below the base member 60.

In this example, there are more rear leg members 64 than front leg members 62. However, the number of front leg members 62 can be greater than the number of rear leg members 64, or the number of the front and rear leg members 62 and 64 can be the same. Also, rear leg member 64-5 is situated closer to a lateral center of the base member 60 than any of the front leg members 62. In addition, rear leg members 64-3 and 64-7 are longer than any of the front leg members 62. However, the front and rear leg members 62 and 64 can have any suitable lengths. Hence, the elongated base member 60, the upper hood layer 36, the front leg members 62 and the rear leg members 64 can be configured such that at least some or all of the front leg members 62 have equal lengths and at least some or all of the rear leg members 64 have equal lengths. Furthermore, some or all of the front leg members 62 can have the same lengths as some or all of the rear leg members 64.

Figure 11:
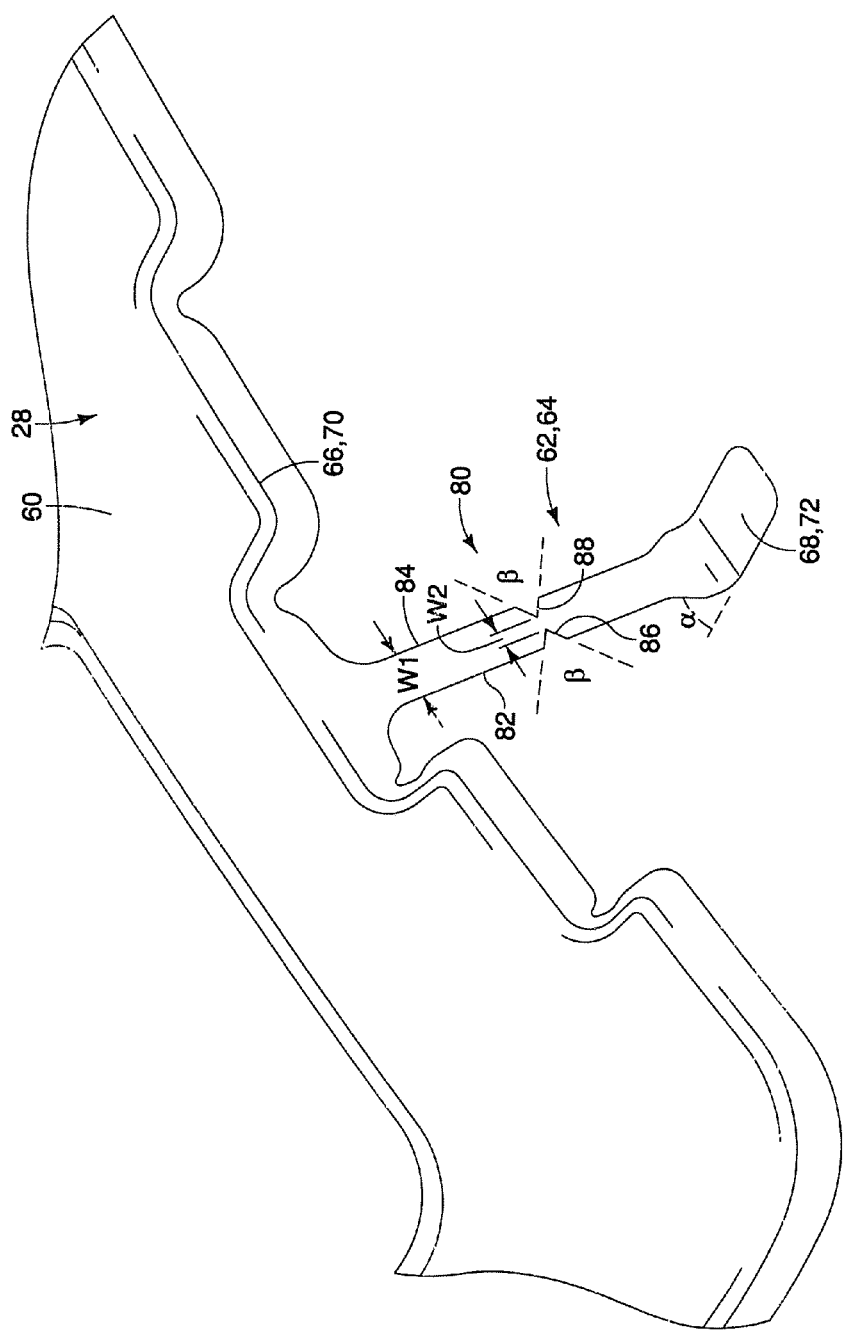
FIG. 11 is a detailed perspective view of an exemplary leg member that extends from the elongated base member of the support member.

FIG. 11 illustrates an example of a leg member that can represent the general configuration of any of the front and rear leg members 62 and 64. As shown, each of the plurality of front leg members 62 extends from a forward portion 66 of the elongated base member 60 to a free end 68 that is coupled to the top surface 44 of the upper hood layer 36. Similarly, each of the plurality of rear leg members 64 extends from a rearward portion 70 of the elongated base member 60 to a free end 72 that is coupled to the top surface 44 of the upper hood layer 36. In this example, the free ends 68 and 72 of front and rear leg members 62 and 64, respectively, are coupled to the top surface 44 of the upper hood layer 36 by, for example, welds or any suitable types of fasteners such as screws, bolts, rivets and so on. As shown in more detail in FIG. 9, the free end 68 of at least one of the front leg members 62 is coupled to the forward slanted portion 50, and the free end 72 of at least one of the rear leg members 64 is coupled to the rearward slanted portion 52. Also, in this example, the free end 72 of at least one of the rear leg members 64 is coupled to the planar portion 54. Naturally, any or all of the front leg members 62 and rear leg members 64 can be coupled to the planar portion 54. Moreover, any or all of the front leg members 62 can be coupled to the forward slanted portion 50, and any or all of the rear leg members 64 can be coupled to the rearward slanted portion 52.

As further shown in FIG. 9, for example, each of a first group of the front leg members 62 (e.g., one or more front leg members 62) extends at a first angle θ1 relative to the elongated base member 60. Likewise, each of a second group of the front leg members 64 (e.g., one or more of the front leg members 62) extends at a second angle θ2 relative to the elongated base member 60. The first and second angles θ1 and θ2 are different from each other and can be any suitable angles. Naturally, all of the front leg members 62 can extend at the same angle from the elongated base member 60 (i.e., the first and second angles θ1 and θ2 can be equal). Furthermore, the free end 68 of each of a first group of the front leg members 62 (e.g., front leg members 62-3 and 62-6) extends further in the forward direction of the vehicle 10 than does the free end 68 of each of a second group of the front leg members 62 (e.g., the front leg members 62-1, 62-2, 62-4, 62-5, 62-7 and 62-8). Also, in this example, the elongated base member 60 includes a central portion 73 defining first, second, and third openings 74, 76 and 78, respectively. In particular, the openings 74, 76, and 78 collectively extend across the base member 60 in a lateral direction of the vehicle 10 such that the longest two front leg members 62-3 and 62-6 are laterally spaced further from the center of the base member 60 than the openings 74, 76, and 78.

In addition, each of a first group of the rear leg members 64 (e.g., one or more rear leg members 64) extends at a first angle θ3 relative to the elongated base member 60. Likewise, each of a second group of the rear leg members 64 (e.g., one or more rear leg members 64) extends at a second angle θ4 relative to the elongated base member 60. The first and second angles θ3 and θ4 are different from each other and can be any suitable angles. Naturally, all of the rear leg members 64 can extend at the same angle from the elongated base member 60 (i.e., the first and second angles θ3 and θ4 can be equal). Thus the varying angles (e.g., θ1, θ2, θ3 and θ4) at which the front and rear leg members 62 and 64 extend from the base member 60 can compensate for and adapt to the particular contours of the upper hood layer 36 to ensure that the support member 28 is adequately mounted. Furthermore, the free end 72 of each of a first group of the rear leg members 64 (e.g., rear leg members 64-3 and 64-7) extends further in the rearward direction of the vehicle 10 than does the free end 72 of each of a second group of the rear leg members 64 (e.g., the rear leg members 64-1, 64-2, 64-4 through 64-6, 64-8 and 64-9). Accordingly, as shown in more detail in FIG. 11, each of the front and rear leg members 62 and 64 extends at a respective angle α relative to the upper hood layer 36, with the respective angle α depending on the portion of the base member 60 from which a particular one of the front and rear leg members 62 and 64 extends and whether a respective free end 68 or 72 is coupled to the forward slanted portion 50, the rearward slanted portion 52 or the planar portion 54.

As further illustrated in FIG. 11, in particular, one or more of the front and rear leg members 62 and 64 can include a deformation structure 80. In the example illustrated in the figures, each of the front and rear leg members 62 and 64 includes a deformation structure 80. However, configurations where fewer than all of the front and rear leg members 62 and 64 include a deformation structure 80 are also contemplated. For example, a particular design may be configured such that only each of the middle three rear leg members 64-4, 64-5, and 64-6 includes a deformation structure 80 in order to focus and/or tune the deformation characteristics of the support member 28. The deformation structure 80 is an area at which the front and rear leg members 62 and 64 can be induced to bend when the inner surface 32 of the outer hood member 34 moves closer to the inner hood member 26 (e.g., the top surface 44 of the upper hood layer 36) upon application of a prescribed amount of force F to the outer surface 30 of the outer hood member 24. In other words, the front and rear leg members 62 and 64 can be induced to collapse at the deformation structure 80 in a particular manner upon application of the prescribed amount of force F. Accordingly, each of the front and rear leg members 62 and 64 includes opposite first and second elongated edges 82 and 84, respectively, extending between the elongated base member 60 and the free end 68 and 72. At least one of the first and second elongated edges 82 and 84 defines a notch 86 or 88 at the deformation structure 80. In this example, each of the first and second elongated edges 82 and 84 defines a respective notch 86 and 88 at the deformation structure 80. That is, the first elongated edge 82 defines a first notch 86 at the deformation structure 80, and the second elongated edge 84 defines a second notch 88 at the deformation structure 80, with the first and second notches 86 and 88 extending toward each other.

As further shown, the notches 86 and 88 are each triangular shaped. That is, the widths of the notches 86 and 88 decrease in a respective depth direction of the notches 86 and 88, with the respective depth direction extending transverse to the first and second elongated edges 82 and 84 defining the notches 86 and 88. In this example, the overall width W1 of the front and rear leg members 62 and 64 can be 20 mm, and the overall width W2 at the portion of the front and rear leg members 62 where the notches 86 and 88 approach each other can be 5 mm. Naturally, the widths W1 and W2 can be any suitable dimensions, and thus, the ratio of the widths W2/W1 can be any suitable value. Furthermore, the angles β defined by each of the notches 86 and 88 can be at or about 90 degrees or any other suitable angle. For example, the angle β of the notches 86 and 88 for a first group among the front and rear leg members 62 and 64 can be a first value, and the angle β of the notches 86 and 88 for a second group among the front and rear leg members 62 and 64 can be a second value that is different from the first value. Any of the angles β or widths W1 and W2 of the notches 86 and 88 can be adjusted as needed and/or desired in order for the support member 28 to achieve particular deformation characteristics.

Figure 12:
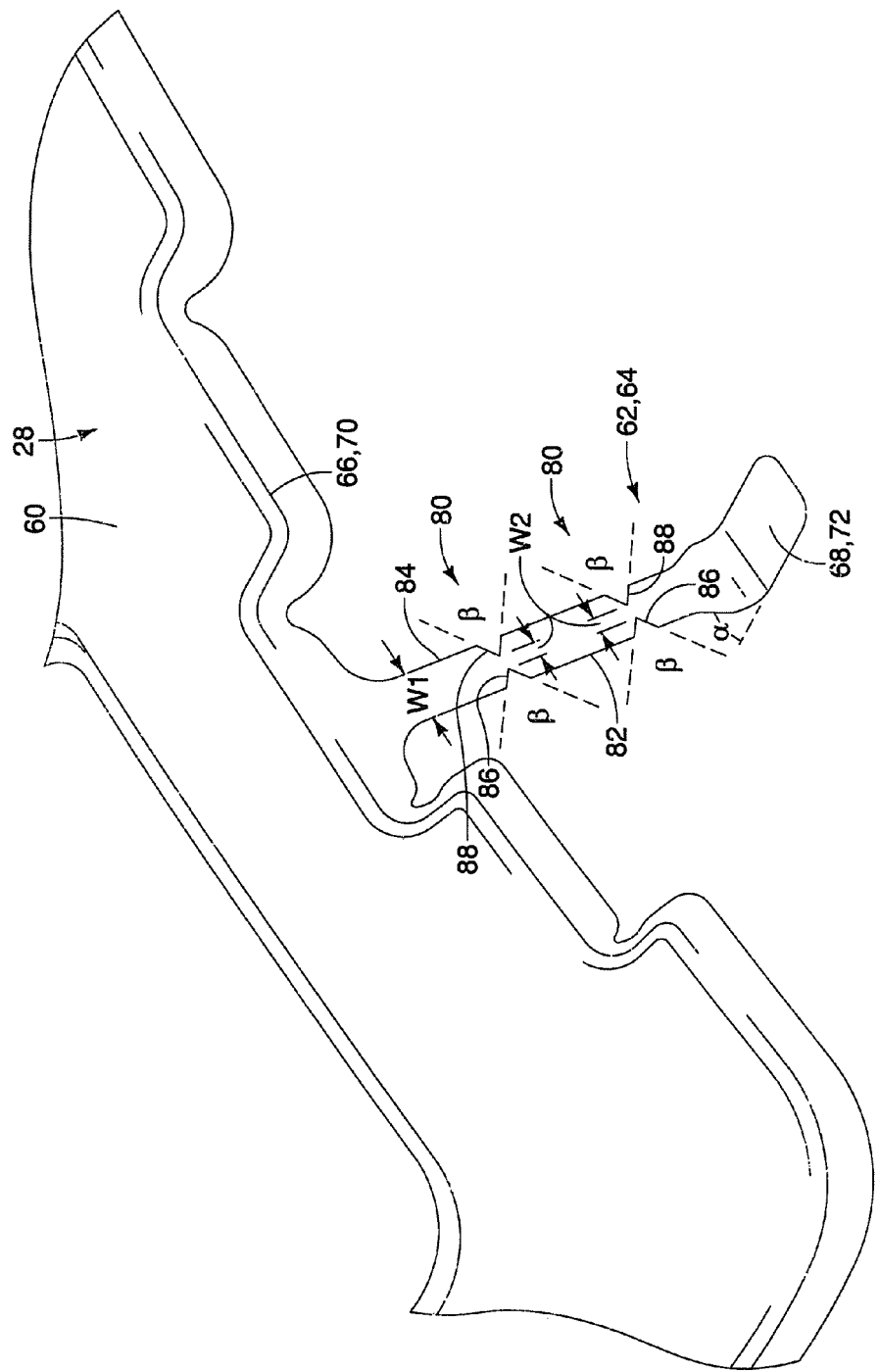
FIG. 12 is a detailed perspective view of another exemplary leg member that extends from the elongated base member of the support member.

In addition, as shown in FIG. 12, any or all of the front and rear leg members 62 and 64 can include a plurality of deformation structures 80. For instance, any or all of the front and rear leg members 62 and 64 can include a plurality of notches 86 (e.g., two or more) formed in the first elongated edge 82. Likewise, any or all of the front and rear leg members 62 and 64 can include a plurality of notches 88 (e.g., two or more) formed in the second elongated edge 84. The overall width W1 of the front and rear leg members 62 and 64, and the overall width W2 at the portion of the front and rear leg members 62 where the notches 86 and 88 approach each other, can have the dimensions as discussed above, or any other suitable dimensions. Furthermore, the angles β of each of the notches 86 and 88 can be at or about 90 degrees, and can be the same or different for any or all of the respective front and rear leg members 62 and 64 as discussed above.

Figure 13:
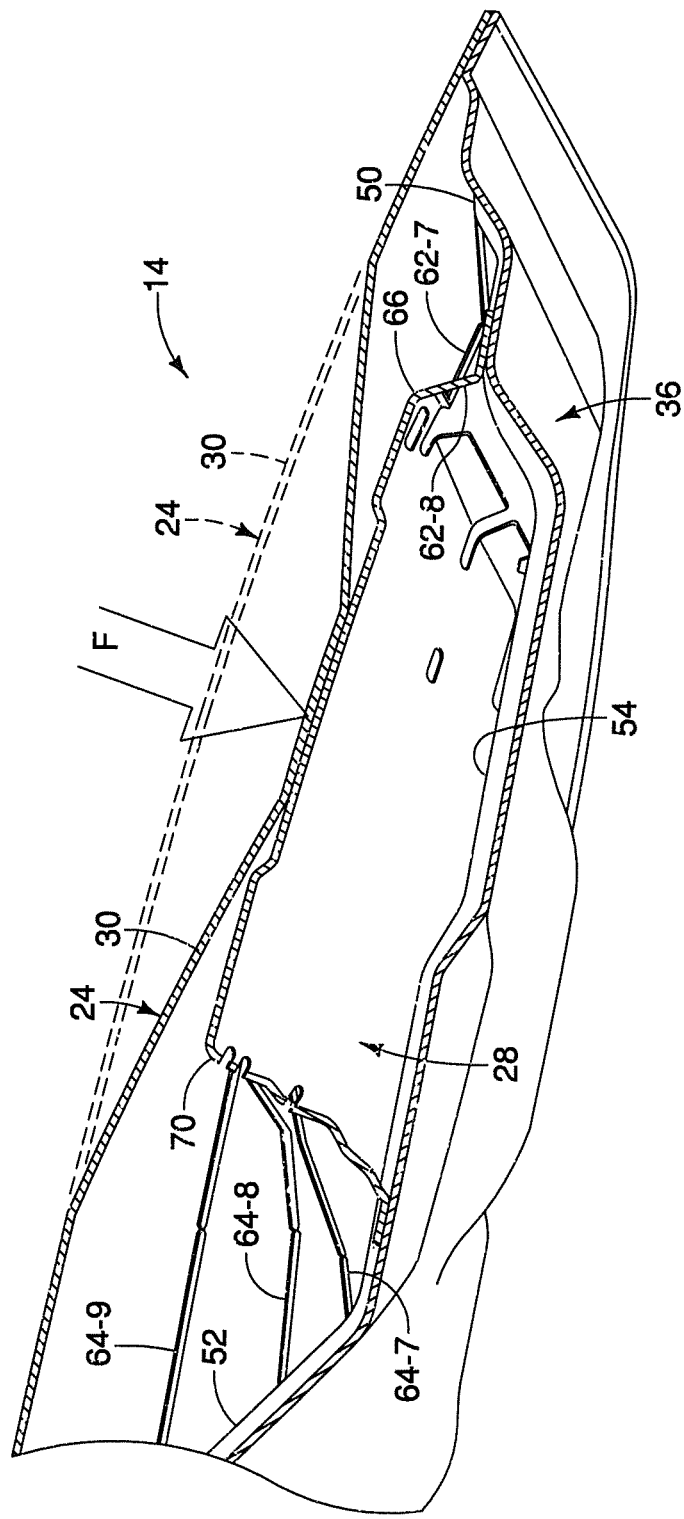
FIG. 13 is a side cross-sectional view of the front portion of the vehicle hood in a compressed state.

Accordingly, as shown in FIG. 13, the front and rear leg member 62 and 64 can bend at the deformation structures 80 when a force F is applied to the outer surface 30. Thus, the arrangement discussed herein enables the outer hood member 24 to travel a suitable stroke distance when an exterior force F is applied to the outer surface 30. In other words, the arrangement discussed herein allows the vehicle hood 14 to sufficiently absorb kinetic energy while at the same time reducing spring back effects due to rebound acceleration. In this example, the total distance D (see FIG. 9) between the inner surface 32 of the outer hood member 24 and the top surface 44 of the upper hood layer 36 can be at or about 78 mm. However, the distance D can be any suitable distance. Thus, the vehicle hood energy absorbing assembly 22 can ensure that the vehicle hood 14 exhibits desired energy absorbing characteristics. Additionally, the arrangement discussed herein can be applied to other structures of the vehicle 10 such as the front fender panels 16 and the bumper fascia retainer 19. For example, mounting brackets that attach the front fender panels 16 to underlying engine compartment metal can be designed to include one or more deformation structures 80 in order for the front fender panels 16 to exhibit desired energy absorption characteristics.

As an alternative configuration, the front and rear leg members 62 and 64 can have no notches and thus have a uniform or substantially uniform width along the first and second elongated edges 82 and 84. In this event, the distance D (see FIG. 9) between the inner surface 32 of the outer hood member 24 and the top surface 44 of the upper hood layer 36 should be adjusted accordingly. Typically, the distance D in this scenario will be larger than the distance D for the arrangement with the notched front and rear leg members 62 and 64.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiments, the following directional terms "forward, rearward, above, downward, vertical, horizontal, below and transverse" as well as any other similar directional terms refer to those directions of a vehicle equipped with the present invention. Accordingly, these terms, as utilized to describe the present invention should be interpreted relative to a vehicle equipped with the present invention.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A vehicle hood energy absorbing assembly comprising:
an outer hood member including an outer surface facing an exterior of a vehicle and an inner surface facing an interior of the vehicle;
an inner hood member coupled to the inner surface of the outer hood member to define a space between the outer and inner hood members; and
a support member disposed within the space, the support member including an elongated base member, a plurality of front leg members and a plurality of rear leg members, an entirety of the elongated base member being supported out of contact with the inner hood member by the plurality of front and rear leg members such that the elongated base member is disposed adjacent the inner surface of the outer hood member and extends in a lateral direction of the vehicle along a majority of the outer and inner hood members, each of the plurality of front leg members extending from a forward portion of the elongated base member to a free end that is coupled to the inner hood member, each of the plurality of rear leg members extending from a rearward portion of the elongated base member to a free end that is coupled to the inner hood member, the free end of a first leg member among the of rear leg members extending further in a rearward direction of the vehicle than does the free end of a second leg member among the plurality of rear leg members, and at least one leg member among the plurality of front leg members and the plurality of rear leg members including a deformation structure at which the at least one leg member at least partially collapses upon application of a prescribed amount of force to the outer surface of the outer hood member.

2. The vehicle hood energy absorbing assembly according to claim 1, wherein
the at least one leg member includes opposite first and second elongated edges extending between the elongated base member and the free end of the at least one leg member, with at least one of the first and second elongated edges defining a notch at the deformation structure.

3. The vehicle hood energy absorbing assembly according to claim 2, wherein
the notch is triangular shaped.

4. The vehicle hood energy absorbing assembly according to claim 1, wherein
at least one leg member among the plurality of front leg members and the plurality of rear leg members extends at a first angle with respect to the elongated base member and at least another leg member among the plurality of front leg members and the plurality of rear leg members extends at a second angle with respect to the elongated base member, with the first and second angles being different from each other.

5. The vehicle hood energy absorbing assembly according to claim 1, wherein the free end of a third leg member among the plurality of front leg members extends further in a forward direction of the vehicle than does the free end of a fourth leg member among the plurality of front leg members.

6. The vehicle hood energy absorbing assembly according to claim 1, wherein
the plurality of rear leg members includes a first number of leg members and the plurality of front leg members includes a second number of leg members that is less than the first number of leg members.

7. The vehicle hood energy absorbing assembly according to claim 1, wherein
the elongated base member includes a central portion defining at least one opening therethrough.

8. The vehicle hood energy absorbing assembly according to claim 7, wherein
the at least one opening extends across the base member in the lateral direction of the vehicle such that a longest two of the plurality of front leg members are laterally spaced further from a central portion of the base member than the at least one opening.

9. The vehicle hood energy absorbing assembly according to claim 1, wherein
one of the plurality of rear leg members is laterally situated closer to a central portion of the base member than any of the plurality of front leg members.

10. The vehicle hood energy absorbing assembly according to claim 1, wherein
one of the plurality of rear leg members is longer than any of the plurality of front leg members.

11. The vehicle hood energy absorbing assembly according to claim 1, wherein
a longest one of the plurality of rear leg members is laterally spaced further from a central portion of the base member than a longest one of the plurality of front leg members.

12. The vehicle hood energy absorbing assembly according to claim 1, wherein
the space includes a rear space portion and a front space portion that is situated closer to a forward edge of the vehicle hood energy absorbing assembly than the rear space portion, with the inner surface of the outer hood member and the inner hood member being spaced further from each other in the front space portion than in the rear space portion, and the support member being disposed in the front space portion.

13. The vehicle hood energy absorbing assembly according to claim 12, wherein
the inner hood member includes a forward slanted portion, a rearward slanted portion, and a planar portion situated therebetween, with the forward slanted portion extending from a front edge of the planar portion toward the inner surface of the outer hood member, the rearward slanted portion extending from a rear edge of the planar portion toward the inner surface of the outer hood member, and the forward and rearward slanted portions and the planar portion cooperating to at least partially define the front space portion.

14. The vehicle hood energy absorbing assembly according to claim 13, further comprising
a lock structure having a striker that is mounted to the planar portion of the inner hood member below the support member.

15. The vehicle hood energy absorbing assembly according to claim 13, wherein
the support member substantially spans the forward slanted portion and the rearward slanted portion in a longitudinal direction of the vehicle.

16. The vehicle hood energy absorbing assembly according to claim 1, wherein
the at least one leg member is among the plurality of rear leg members and is situated adjacent to a central portion of the base member.

17. A vehicle hood energy absorbing assembly comprising:
an outer hood member including an outer surface facing an exterior of a vehicle and an inner surface facing an interior of the vehicle;
an inner hood member coupled to the inner surface of the outer hood member to define a space between the outer and inner hood members; and
a support member disposed within the space, the support member including an elongated base member, a plurality of front leg members and a plurality of rear leg members, the elongated base member being disposed adjacent the inner surface of the outer hood member and extending in a lateral direction of the vehicle along a majority of the outer and inner hood members, each of the plurality of front leg members extending from a forward portion of the elongated base member to a free end that is coupled to the inner hood member, each of the plurality of rear leg members extending from a rearward portion of the elongated base member to a free end that is coupled to the inner hood member, and at least one leg member among the plurality of front leg members and the plurality of rear leg members including a deformation structure at which the at least one leg member at least partially collapses upon application of a prescribed amount of force to the outer surface of the outer hood member, the at least one leg member further including opposite first and second elongated edges extending between the elongated base member and the free end of the at least one leg member, with at least one of the first and second elongated edges defining a notch at the deformation structure such that a width of the notch decreases in a depth direction of the notch that extends transverse to the at least one of the first and second elongated edges defining the notch.

18. A vehicle hood energy absorbing assembly comprising:
an outer hood member including an outer surface facing an exterior of a vehicle and an inner surface facing an interior of the vehicle;
an inner hood member coupled to the inner surface of the outer hood member to define a space between the outer and inner hood members; and
a support member disposed within the space, the support member including an elongated base member, a plurality of front leg members and a plurality of rear leg members, the elongated base member being disposed adjacent the inner surface of the outer hood member and extending in a lateral direction of the vehicle along a majority of the outer and inner hood members, each of the plurality of front leg members extending from a forward portion of the elongated base member to a free end that is coupled to the inner hood member, each of the plurality of rear leg members extending from a rearward portion of the elongated base member to a free end that is coupled to the inner hood member, and at least one leg member among the plurality of front leg members and the plurality of rear leg members including a deformation structure at which the at least one leg member at least partially collapses upon application of a prescribed amount of force to the outer surface of the outer hood member, and the at least one leg member including opposite first and second elongated edges extending between the elongated base member and the free end of the at least one leg member, the first elongated edge defining a first notch at the deformation structure and the second elongated edge defining a second notch at the deformation structure, the first and second notches extending toward each other.

19. A vehicle hood energy absorbing assembly comprising:
an outer hood member including an outer surface facing an exterior of a vehicle and an inner surface facing an interior of the vehicle;
an inner hood member coupled to the inner surface of the outer hood member to define a space between the outer and inner hood members; and
a support member disposed within the space, the support member including an elongated base member, a plurality of front leg members and a plurality of rear leg members, an entirety of the elongated base member being supported out of contact with the inner hood member by the plurality of front and rear leg members such that the elongated base member is disposed adjacent the inner surface of the outer hood member and extends in a lateral direction of the vehicle along a majority of the outer and inner hood members, each of the plurality of front leg members extending from a forward portion of the elongated base member to a free end that is coupled to the inner hood member, each of the plurality of rear leg members extending from a rearward portion of the elongated base member to a free end that is coupled to the inner hood member, and at least one leg member among the plurality of front leg members and the plurality of rear leg members including a deformation structure at which the at least one leg member at least partially collapses upon application of a prescribed amount of force to the outer surface of the outer hood member, the at least one leg member further including opposite first and second elongated edges extending between the elongated base member and the free end of the at least one leg member, with at least one of the first and second elongated edges defining first and second spaced apart notches at the deformation structure.

20. The vehicle hood energy absorbing assembly according to claim 19, wherein
the free end of a first leg member among the plurality of rear leg members extends further in a rearward direction of the vehicle than does the free end of a second leg member among the plurality of rear leg members.

* * * * *